Figure 1:
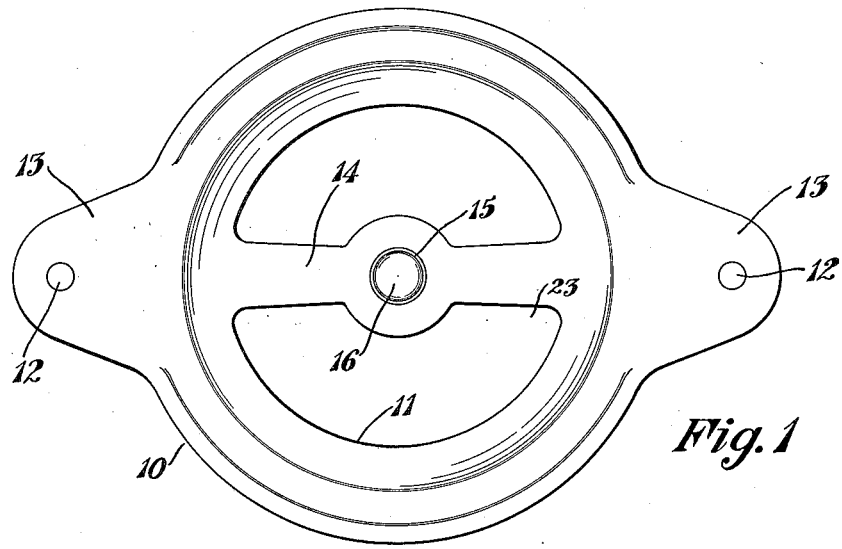

Nov. 3, 1936.  M. L. HUNKER  2,059,793
STOVE DAMPER AND MANUFACTURE OF SAME
Filed April 8, 1935  2 Sheets-Sheet 1

Inventor
M. L. Hunker
By Frease and Bishop
Attorneys

Nov. 3, 1936.  M. L. HUNKER  2,059,793

STOVE DAMPER AND MANUFACTURE OF SAME

Filed April 8, 1935  2 Sheets-Sheet 2

Inventor

M. L. Hunker

By Frease and Bishop

Attorneys

Patented Nov. 3, 1936

2,059,793

UNITED STATES PATENT OFFICE 2,059,793

STOVE DAMPER AND MANUFACTURE OF SAME

Martin L. Hunker, Dover, Ohio, assignor to The Reeves Manufacturing Company, Dover, Ohio, a corporation of Ohio Application April 8, 1935, Serial No. 15,301

1 Claim. (Cl. 126—290)

The invention relates to a damper for stoves, particularly adapted for use upon sheet metal heating stoves, and to the manner in which the same is made.

Dampers of the general type to which the invention pertains comprise a sheet metal plate or disk having a screw threaded stem fixed thereto and threaded into a stationary portion of the stove, a handle portion being provided at the outer end of the screw threaded stem for rotating the same so as to move the sheet metal plate or disk toward or away from the stove in order to close or uncover an opening in the stove through which air for combustion may be admitted.

In dampers of this general character the screw threaded stem is ordinarily in the form of a malleable iron casting, the sheet metal damper plate or disk being fixed thereto by upsetting an intermediate portion of the malleable iron stem to form lugs or shoulders which are pressed tightly down upon the damper plate, rigidly attaching the same to the stem.

It is also customary to form the handle upon the screw threaded stem by providing a pair of oppositely disposed axially alined arms upon the outer end portion of the stem to be grasped between the thumb and fingers in order to rotate the stem to adjust the position of the damper.

Malleable iron castings are expensive as compared with gray iron castings and one object of the present improvement is to provide a damper of the character referred to which is so constructed that the screw threaded stem may be formed of a gray iron casting.

Another object of the improvement is to provide an improved form of handle upon the screw threaded stem by forming outwardly angled diverging arms upon the outer end of the same, thus locating the ends of the arms, which are engaged by the thumb and fingers, considerably farther away from the hot damper than the usual form of handle, whereby the same will be much cooler, thus preventing the user from burning his thumb or fingers when operating the damper.

A further object is to provide a damper of this character comprising a screw threaded stem having two spaced shoulders near its outer end, the damper plate or disk being formed of sheet metal and having a central opening surrounded by an inwardly disposed annular flange, the sheet metal disk being attached to the threaded stem by springing said flange over one of said shoulders and then contracting the flange below said shoulder so as to tightly fix the damper plate upon the stem between the two shoulders.

Figure 2:
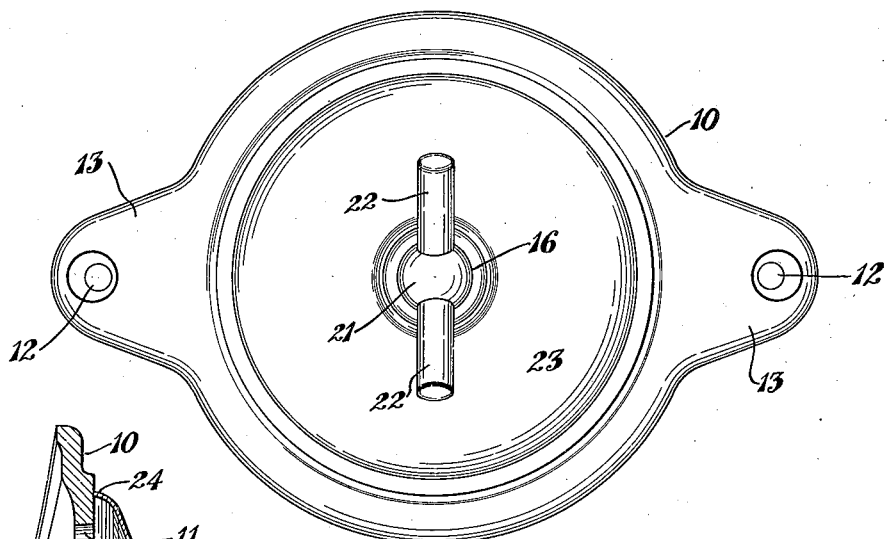
Figure 3:
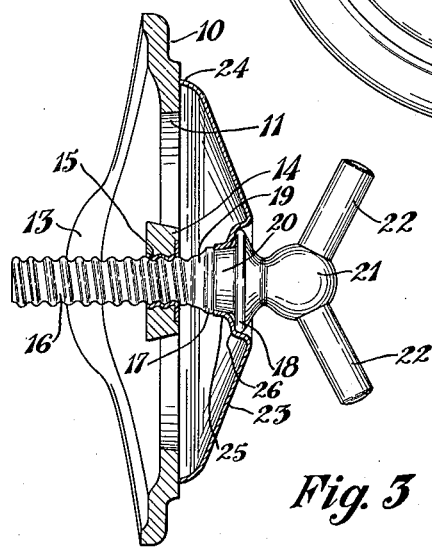
Figure 4:
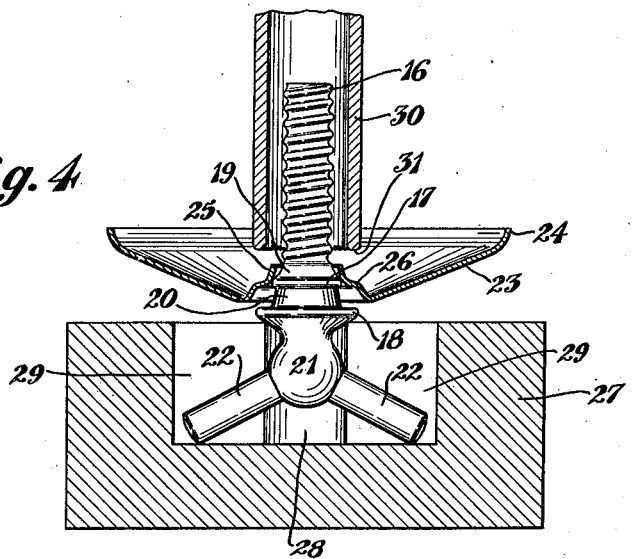
Figure 5:
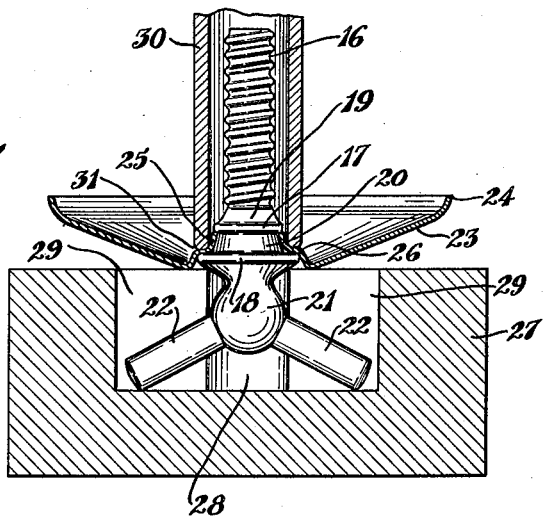

The above objects, together with others which will be apparent from the drawings and following description, or which may be later pointed out, may be attained by constructing the improved damper in the manner illustrated in the accompanying drawings, in which Figure 1 is a rear or inner elevation of the improved damper and the casting by means of which it is connected to the stove;

Fig. 2, a front or outer elevation of the same;

Fig. 3, a vertical sectional view through the damper and casting shown in Figs. 1 and 2;

Fig. 4, a sectional view through the dies by means of which the sheet metal damper plate or disk is attached to the threaded stem, the parts of the damper being shown in position for assembly; and Fig. 5, a similar view showing the manner in which the assembly is completed.

Similar numerals refer to similar parts throughout the drawings.

The type of damper to which the invention pertains is especially adapted for use upon sheet metal heating stoves and for the purpose of mounting the damper upon the sheet metal side wall of the stove, a casting indicated generally at 10 is usually provided, this casting having a central opening 11 of sufficient size to permit entrance to the stove of the desired amount of air for combustion and being attached to the sheet metal side wall of the stove as by rivets or the like located through the apertures 12 formed in the ears 13 of the casting. A spider or skeleton frame 14 may be located through the center of the opening 11 and provided with a central threaded aperture 15 through which the screw threaded stem 16 is adjustably located.

This screw threaded stem may be in the form of a gray iron casting and is provided near its outer end with the spaced integral annular shoulders 17 and 18, the latter being preferably of considerably greater diameter than the shoulder 17.

The stem 16 is preferably flared outward from the screw threaded portion to the shoulder 17, as indicated at 19, and the enlarged outer end portion of the stem between the shoulders 17 and 18 is preferably conical or outwardly flared as shown at 20. At the outer end of the stem 16, beyond the shoulder 18, is formed a ball 21 provided with two oppositely disposed outwardly diverging arms 22.

The damper plate or disk 23 may be of sheet metal, preferably slightly conical in form as shown, the peripheral edge being curved inward as at 24 so as to tightly fit against the face of the casting 10 when the damper is in closed position, as illustrated in Fig. 3. The damper plate 23 is provided with a central opening surrounded by the inwardly disposed annular flange 25 which is preferably inwardly tapered as shown and which may be shouldered intermediate its ends as at 26.

In attaching the damper plate 23 to the threaded stem, the stem may be first seated in a die block 27 provided with a central bore 28 to receive the ball portion 21 of the handle of the stem and with the slots 29 to receive the arms 22.

The sheet metal damper plate 23 is then positioned upon the stem as shown in Fig. 4, the screw threaded portion of the stem being received through the central opening of the damper plate and the tapered inturned annular flange 25 of the damper plate resting upon the shoulder 17 of the stem.

The upper or movable die, which is in the form of a tube 30 having a rounded lower edge 31, is then moved downward around the screw threaded stem, the lower end thereof engaging the shouldered portion 26 of the annular flange 25, springing the flange over the shoulder 17, seating the shouldered portion 26 of flange against the shoulder 18 of the stem and forcing the inner tapered end of the flange 25 around the portion 26 of the stem and beneath the shoulder 17 as shown in Fig. 5. When the tubular die 30 is withdrawn, the assembled damper may be removed from the die block 27, the sheet metal damper plate 23 being thus rigidly clamped upon the screw threaded stem 16.

The advantages of this method of attaching the sheet metal damper plate to the screw threaded stem are obvious, since with this arrangement, it is possible to use a stem formed of a gray iron casting which costs considerably less than a malleable iron casting.

By providing the outwardly diverging angular arms 22 upon the handle portion of the damper, it will be seen that the tips of these arms, which are the only part engaged by the thumb and finger in adjusting the damper, are located considerably farther away from the hot damper than the usual handle construction in which the arms extend outward at right angles to the stem, thus permitting the operation of the damper without danger of burning the thumb or finger.

I claim:

A damper including a threaded stem having a handle portion at one end, an unthreaded, conical portion adjacent to said handle portion, an integral, annular shoulder at each end of said conical portion of the stem, and a sheet metal damper plate having a central opening surrounded by an annular tapered flange having an annular shouldered portion tightly fitting against one of said shoulders, the edge of said flange tightly fitting against the other shoulder, and the tapered flange being rigidly clamped upon the conical portion of the stem.

MARTIN L. HUNKER.